(12) United States Patent
Takenaka et al.

(10) Patent No.: US 12,319,020 B2
(45) Date of Patent: Jun. 3, 2025

(54) METHOD OF PRODUCING LENS MOLDED ARTICLE

(71) Applicant: DAICEL CORPORATION, Osaka (JP)

(72) Inventors: Hiroki Takenaka, Tokyo (JP); Hiromi Honma, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 331 days.

(21) Appl. No.: 18/107,178

(22) Filed: Feb. 8, 2023

(65) Prior Publication Data
US 2023/0249424 A1    Aug. 10, 2023

(30) Foreign Application Priority Data

Feb. 8, 2022    (JP) .................................. 2022-018126

(51) Int. Cl.
*B29D 11/00*    (2006.01)
(52) U.S. Cl.
CPC .............................. *B29D 11/00432* (2013.01)
(58) Field of Classification Search
CPC ........ B29D 11/00192; B29D 11/00221; B29D 11/0024
See application file for complete search history.

(56) References Cited

U.S. PATENT DOCUMENTS

| | | | | |
|---|---|---|---|---|
| 8,087,378 B2 * | 1/2012 | Mori | ................ | B29D 11/00865 118/66 |
| 9,796,145 B2 * | 10/2017 | Biel | .................... | B29D 11/0024 |
| 2010/0044893 A1 * | 2/2010 | Biel | .................... | B29C 37/0007 264/2.6 |
| 2010/0089317 A1 * | 4/2010 | Mori | ................ | B29D 11/00865 118/712 |
| 2016/0167322 A1 * | 6/2016 | Biel | ..................... | B25J 15/0616 414/785 |

FOREIGN PATENT DOCUMENTS

JP    5724156 B2    5/2015

* cited by examiner

*Primary Examiner* — Xiao S Zhao
*Assistant Examiner* — Nicholas J Chidiac
(74) *Attorney, Agent, or Firm* — Birch, Stewart, Kolasch & Birch, LLP

(57) ABSTRACT

A method of producing a lens molded article includes a state determination of determining, after molding the lens molded article, whether a state is a first state where the lens molded article molded remains in an upper mold or a second state where the lens molded article molded remains in a lower mold; an adsorption of adsorbing an exposed surface of the lens molded article remaining in the upper mold or the lower mold, by an adsorption device disposed at an arm of a molded article moving device; an adsorption surface change of changing an adsorption surface from a surface adsorbed by the adsorption device to an opposite surface to the exposed surface when the determination result in the state determination is either one of the first state or the second state; and a placement of placing on a tray the lens molded article adsorbed by the adsorption device.

5 Claims, 10 Drawing Sheets

METHOD OF PRODUCING LENS MOLDED ARTICLE

TECHNICAL FIELD

The present invention relates to a method of producing a lens molded article.

BACKGROUND ART

In recent years, electronic devices such as mobile phones, mobile computers, personal digital assistants, and digital still cameras have been dramatically reduced in size and weight and made to have higher performance. Along with these market trends, lenses of cameras mounted on the electronic devices have also been required to be smaller, thinner, and lighter, and wafer-level lenses have been used.

An imprint method or the like has been known, as a method of producing the wafer-level lenses, that includes, for example, a first step of supplying a liquid thermosetting resin material to a lower mold to which a load cell is attached, a second step of moving down an upper mold after the first step to set a gap between the upper mold and the lower mold to a specified value and then heating the upper mold and the lower mold by using a heater, a third step of measuring, with the load cell, a load in a direction of compression generated due to expansion of the lower mold and gelation of the thermosetting resin material after the second step and applied to the lower mold, and a fourth step of moving further down the upper mold when the load in the direction of compression reaches a predetermined value after the third step and thereby decreasing the gap (see Patent Document 1).

In a case where a wafer-level lens is produced by a molding step as described above, the wafer-level lens needs to be adsorbed by an adsorption device and removed from a mold after molding is finished and an upper mold and a lower mold are separated. Then, in many cases, the removed wafer-level lens is transported by a moving device such as a robot arm and placed on a tray for supplying the wafer-level lens to the next step. However, when molding is finished and the upper mold and the lower mold are separated, the molded article may remain in the upper mold or in the lower mold. Depending on whether the molded article remains in the upper mold or in the lower mold, a different surface of the wafer-level lens is adsorbed by the adsorption device, and thus the wafer-level lens may be placed upside down on the tray. As a result, a step of orienting the wafer-level lens in the same vertical direction may be increased, and a wrong operation may occur in the next or following step.

CITATION LIST

Patent Document

Patent Document 1: JP 5724156 B

SUMMARY OF INVENTION

Technical Problem

The technique of the present disclosure has been made in view of the above circumstances, and an object of the present disclosure is to provide a technique that can provide, in the event of molding a lens molded article by using an upper mold and a lower mold, a lens molded article in the same orientation to the next step whether the lens molded article remains in the upper mold or the lower mold.

Solution to Problem

In order to solve the problem described above, a method of producing a lens molded article according to the present disclosure is a method of producing a lens molded article with a mold including an upper mold a lower mold, the method including a state determination of determining, after molding the lens molded article, whether a state is a first state where the lens molded article molded remains in the upper mold with the upper mold and the lower mold separated from each other or a second state where the lens molded article molded remains in the lower mold with the upper mold and the lower mold separated from each other; an adsorption of adsorbing, in accordance with a determination result in the state determination, an exposed surface of the lens molded article remaining in the upper mold or the lower mold, by an adsorption device disposed at a tip of an arm of a molded article moving device; an adsorption surface change of changing an adsorption surface from a surface adsorbed by the adsorption device to an opposite surface to the exposed surface when the determination result in the state determination is either one of the first state or the second state; and a placement of placing on a tray the lens molded article by releasing adsorption by the adsorption device of the lens molded article adsorbed by the adsorption device.

Here, the exposed surface to be adsorbed by the adsorption device differs depending on whether the lens molded article molded is in the first state where the lens molded article remains in the upper mold or in the second state where the lens molded article remains in the lower mold, and the lens molded article adsorbed by the adsorption device is directly placed on the tray. In such a case, the orientation of the lens molded article placed on the tray differs between the first state and the second state. In contrast, in the present disclosure, in either one of the first state and the second state, the surface of the lens molded article that is adsorbed by the adsorption device is changed in the middle of transportation to the tray. Therefore, the same side of the surface of the lens molded article can be adsorbed by the adsorption device consistently in the first state and the second state. As a result, the lens molded article to be placed on the tray can be oriented in the same direction, and an error can be avoided from occurring in the production process.

Further, in the adsorption surface change, adsorption by the adsorption device of the lens molded article adsorbed by the adsorption device is released and thereby the lens molded article may be temporarily placed on a temporary placement tray, and the adsorption device may readsorb the opposite surface to the exposed surface. Accordingly, the surface of the lens molded article that is adsorbed by the adsorption device can be more reliably changed in the middle of transportation to the tray.

Furthermore, the adsorption surface change may be performed only when the state is determined to be the first state in the state determination. Here, in the second state, the exposed surface of the lens molded article remaining in the lower mold is adsorbed from the upper side by the adsorption device, and thus the lens molded article can be moved by the molded article moving device to the tray and placed thereon while being kept in this orientation. On the other hand, in the first state, the exposed surface of the lens molded article is adsorbed from the lower side by the adsorption device, and thus the orientation of the lens molded article needs to be reversed vertically in the middle of transportation and placement of the lens molded article onto the tray. Therefore, by performing the adsorption surface change only in the first state, the entire process related to the lens molding can be more efficient.

Additionally, adsorption portions configured to adsorb a surface of the lens molded article are provided on both of an upper side and a lower side of the adsorption device. In the adsorption, when the determination result in the state determination is the first state, the exposed surface of the lens molded article may be adsorbed by the adsorption portion provided on the upper side of the adsorption device, and when the determination result is the second state, the exposed surface of the lens molded article may be adsorbed by the adsorption portion provided on the lower side of the adsorption device. As just described, the exposed surface of the lens molded article is adsorbed by the adsorption portions provided on the upper side and the lower side of the adsorption device, whereby it is not necessary to reverse the adsorption device vertically in the adsorption and the adsorption surface change. Thus, the entire process related to the lens molding can be more efficient.

Moreover, in the adsorption surface change, the lens molded article may be temporarily placed on the temporary placement tray from the lower side in a state where the exposed surface of the lens molded article is adsorbed by the adsorption portion provided on the upper side of the adsorption device, and the adsorption device may readsorb the opposite surface to the exposed surface from the upper side by the adsorption portion provided on the lower side of the adsorption device. Accordingly, an adsorption surface can be more reliably changed from the surface adsorbed by the adsorption device to the opposite surface to the exposed surface without reversing the adsorption device vertically in the adsorption surface change by using the adsorption portions provided on the upper side and the lower side of the adsorption device. As a result, the entire process related to the lens molding can become more efficient.

Note that, in the present invention, wherever possible, the techniques for solving the above-described problem can be used in combination.

Advantageous Effects of Invention

According to the present disclosure, in the event of molding a lens molded article by using an upper mold and a lower mold, a lens molded article can be provided in the same orientation to the next step whether the lens molded article remains in the upper mold or the lower mold.

DESCRIPTION OF EMBODIMENTS

Embodiments

A method of producing a lens molded article according to an embodiment of the present disclosure will be described below with reference to the drawings. Note that each of the configurations, combinations thereof, and the like in the embodiment are an example, and various additions, omissions, substitutions, and other changes may be made as appropriate without departing from the spirit of the present disclosure. The present disclosure is not limited by the embodiments and is limited only by the claims.

Figure 7:
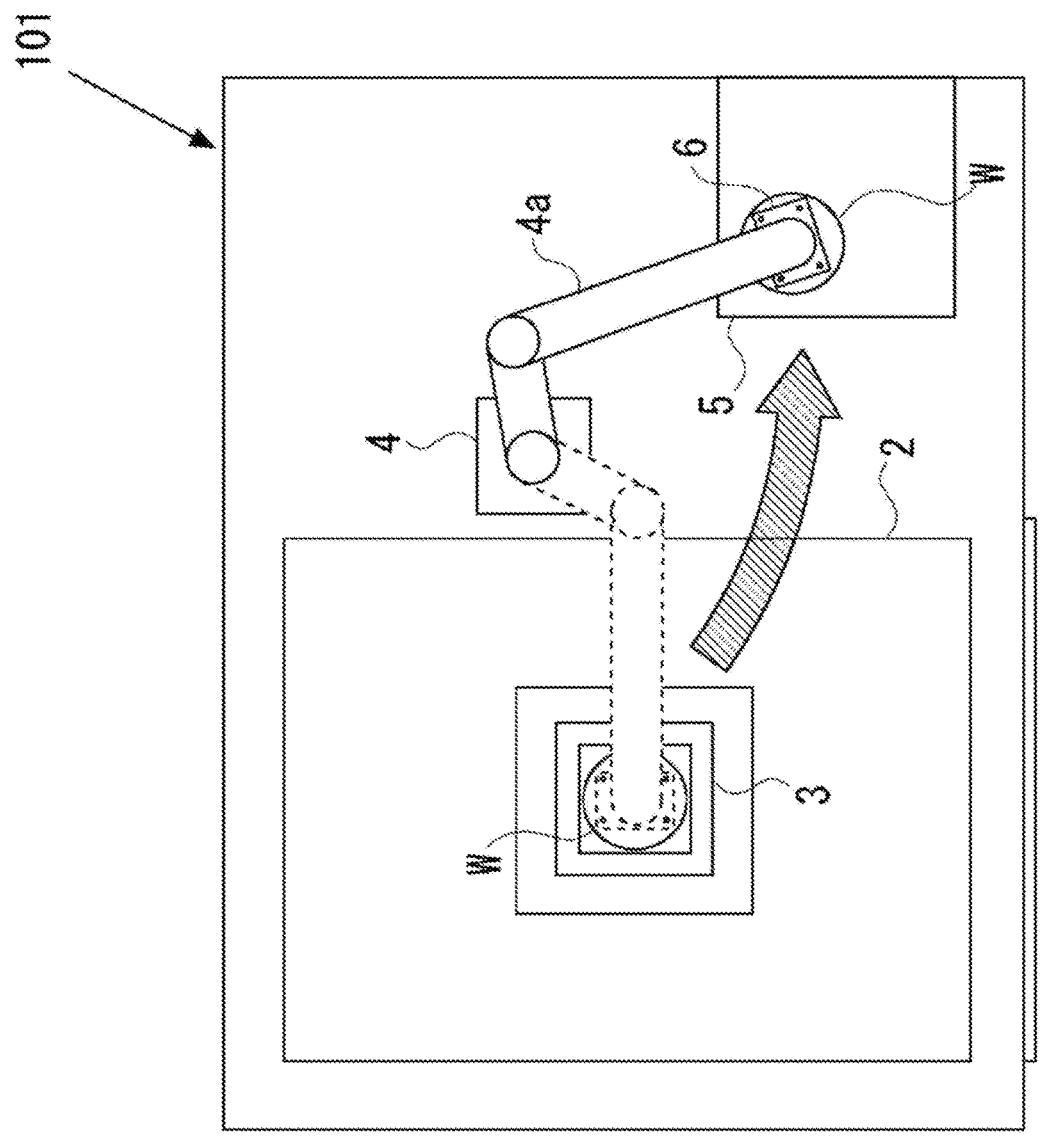
FIG. 7 is a schematic diagram of a lens production device related to a known production method.

FIG. 7 is a schematic diagram of a known lens production device 101 prior to application of the production method in the present embodiment. In the lens production device 101, a molded article including a plurality of lenses, for example, a wafer-level lens (hereinafter, also simply referred to as a wafer W) including a plurality of fine lens structures is produced. The lens production device 101 includes a molding machine 2 configured to mold the wafer W. A mold 3 for molding the wafer W is provided inside the molding machine 2.

Additionally, the lens production device 101 includes a pickup robot 4 configured to remove the wafer W molded by the molding machine 2 from the mold 3. The pickup robot 4 is provided with an arm 4a, and the wafer W remaining in the mold 3 after molding is adsorbed and removed by an adsorption device 6 disposed at a tip of the arm 4a and is mounted on a tray 5 for supplying the wafer W to the next step.

Figure 8A:
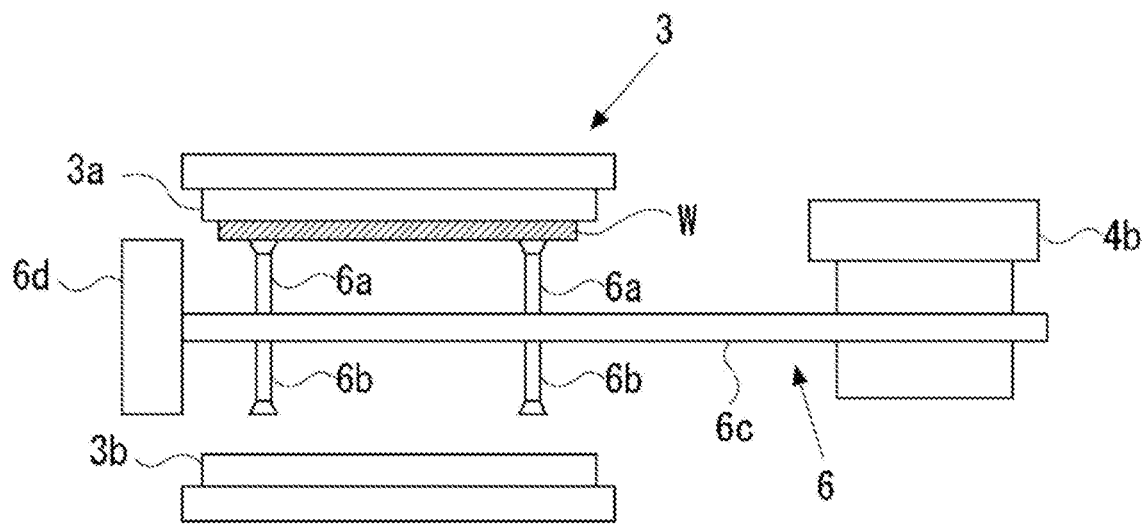
FIG. 8A, 8B are diagrams illustrating in detail an adsorption device.
Figure 8B:
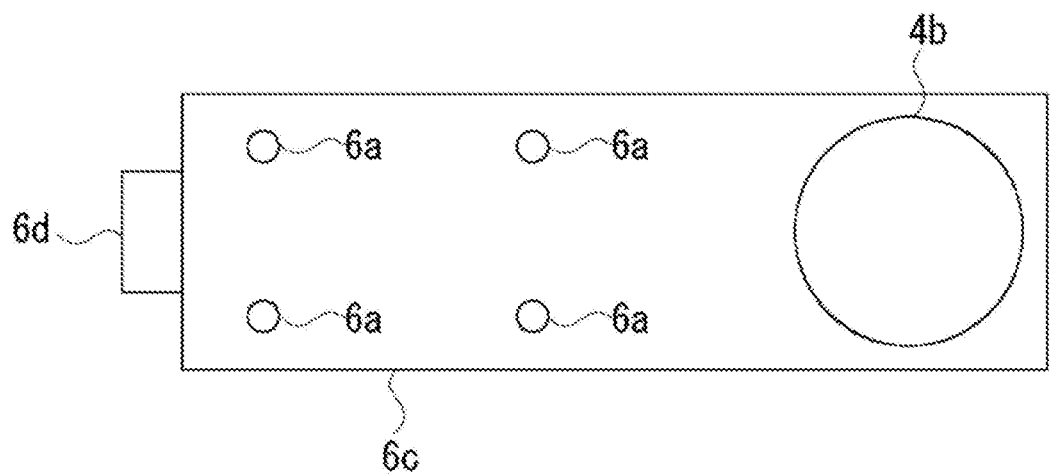

Next, the details of the adsorption device 6 will be described with reference to FIG. 8A, 8B. FIG. 8A is a diagram illustrating an example of a state when the adsorption device 6 adsorbs and removes the wafer W. Also, FIG. 8B is a plan view of the adsorption device 6. As illustrated in FIG. 8A, the adsorption device 6 is coupled to a tip portion 4b of the arm 4a of the pickup robot 4. The adsorption device 6 includes a plate-shaped base 6c. Four adsorption portions 6a and four adsorption portions 6b that can adsorb the wafer W are disposed on the top and bottom at the tip side of the base 6c, respectively. The four adsorption portions 6a and four adsorption portions 6b are disposed in a two-by-two matrix, to stably hold the wafer W, in such a manner that they are located at four corners of a rectangle.

The adsorption portions 6a, 6b are each a tubular portion, and a tip thereof is made of a flexible material such as a rubber and has a sucker-like shape. The adsorption portions 6a, 6b are disposed outside of the pickup robot 4, via intake tubes (not illustrated) disposed inside or on the surface of the base 6c, and are connected to a vacuum device (not illustrated). An air intake operation is performed by the vacuum device, and thus the adsorption portions can closely adhere to the surface of the wafer W. Note that the adsorption portions 6a, 6b are generally disposed at positions where they can adsorb a plane surface other than the lens surface in the wafer W.

Note that, as illustrated in FIG. 8A, the mold 3 in the present embodiment includes an upper mold 3*a* and a lower mold 3*b*. In addition, the wafer W is molded in a state where the upper mold 3*a* and the lower mold 3*b* are coupled; thereafter, the upper mold 3*a* is separated from the lower mold 3*b*. In this case, the wafer W may remain in the lower mold 3*b* or in the upper mold 3*a*. In both the cases, the adsorption device 6 needs to remove the wafer W from the upper mold 3*a* or the lower mold 3*b* by adsorbing the wafer W. The tip of the base 6*c* in the adsorption device 6 is provided with an object detection sensor 6*d* that protrudes in an up-down direction and detects whether the wafer W remains in either of the upper mold 3*a* or the lower mold 3*b*. The object detection sensor 6*d* may be a sensor configured to optically detect the wafer W or may be a sensor configured to detect the wafer W by another principle, such as a capacitive sensor.

Next, the difference between operations of the pickup robot 4 when the wafer W after molding remains in the upper mold 3*a* and when the wafer W remains in the lower mold 3*b* will be described with reference to FIGS. 9 and 10. In FIGS. 9 and 10, the wafer W is illustrated in two layers such that a first surface (e.g., a surface on which a lens is formed) of the wafer W and a second surface located on the opposite side of the first surface can be distinguished from each other.

Figure 9A:
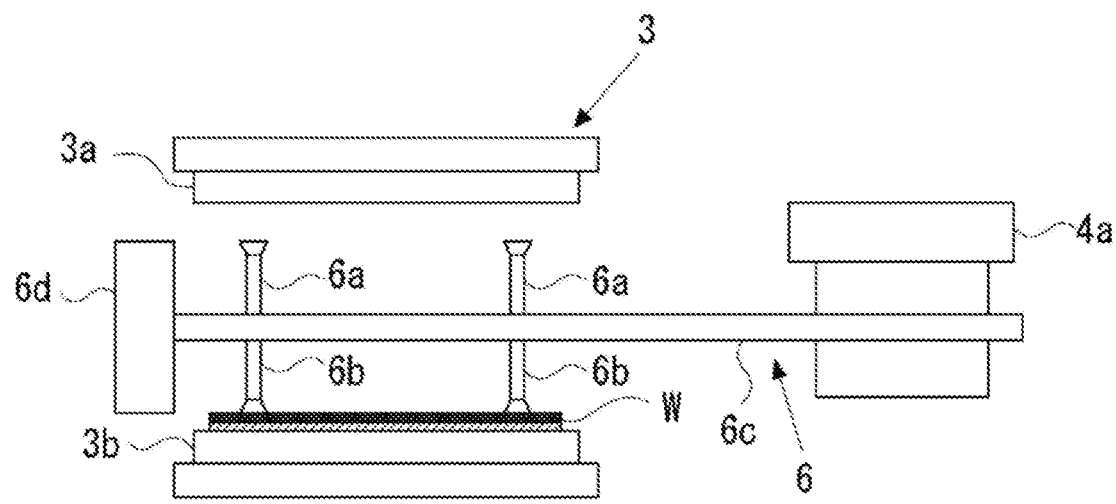
FIG. 9A, 9B are diagrams illustrating a known operation of a pickup robot when the wafer after molding remains in an upper mold.
Figure 9B:
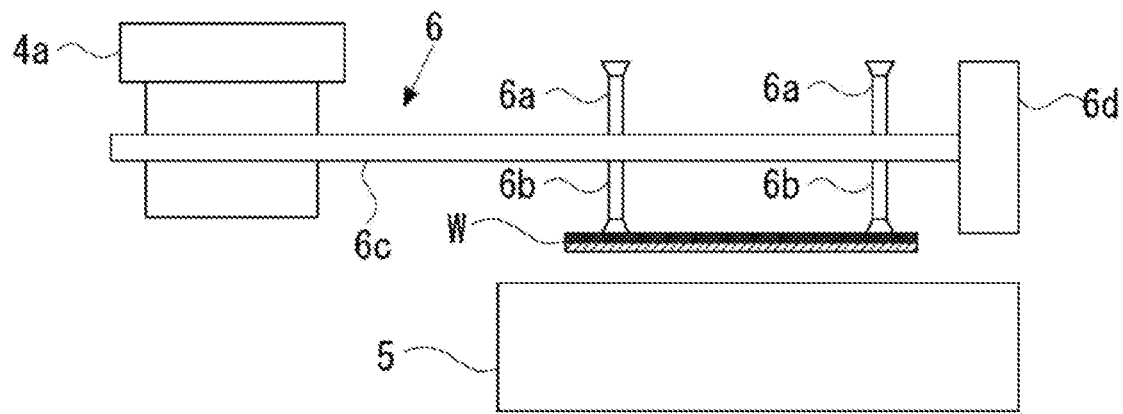

Hereinafter, the darker-shaded side of the wafer W will be described as the first surface. In FIG. 9A, 9B, a case where the wafer W remains in the lower mold 3*b* is illustrated. In this case, as illustrated in FIG. 9A, the adsorption device 6 moves downward from a state where the adsorption device 6 is disposed between the upper mold 3*a* and the lower mold 3*b*, and the adsorption portions 6*b* adsorb the first surface side of the wafer W. This step corresponds to an adsorption step in the present disclosure. Additionally, the first surface of the wafer W in this case corresponds to an exposed surface in the present disclosure.

Then, as illustrated in FIG. 9B, the wafer W is transported to the upper side of the tray 5 by the movement of the arm 4*a*. The tray 5 is a location where the wafer W is temporarily placed in order to provide the wafer W to the next step. Thereafter, the adsorption device 6 moves downward from the upper side of the tray 5 and places the wafer W on the upper surface of the tray 5 and releases adsorption. In this case, the wafer W is placed on the tray with the first surface of the wafer W facing upward.

Figure 10A:
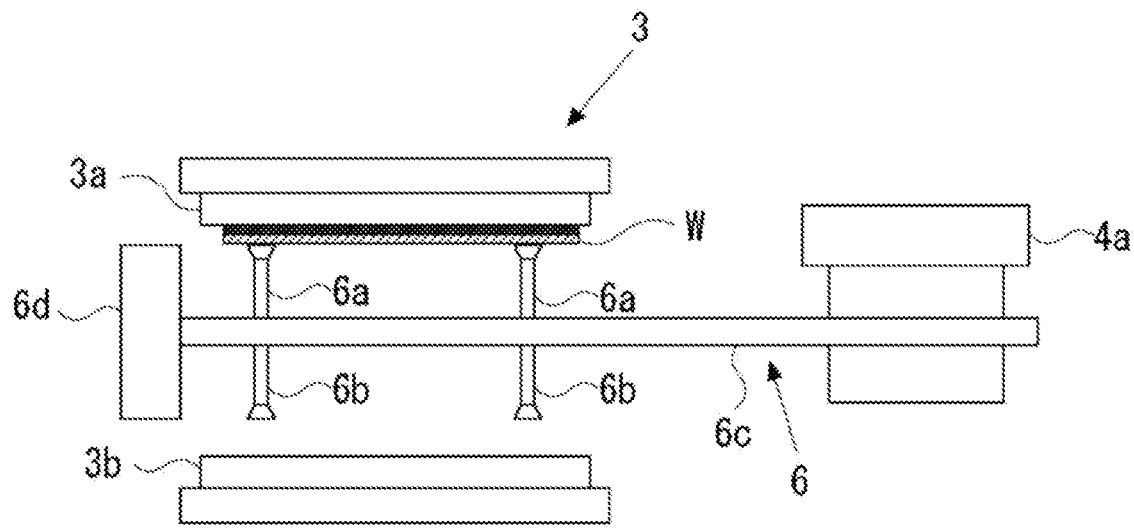
FIG. 10A, 10B are diagrams illustrating a known operation of the pickup robot when the wafer after molding remains in a lower mold.
Figure 10B:
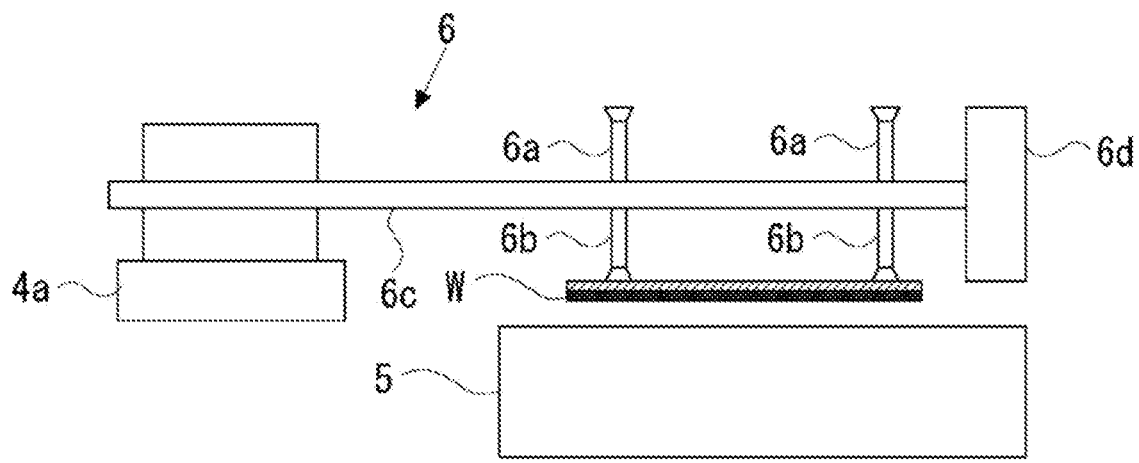

Next, FIG. 10A, 10B illustrate a case where the wafer W remains in the upper mold 3*a*. In this case, as illustrated in FIG. 10A, in removing the wafer W, the adsorption device 6 moves upward from a state where the adsorption device 6 is disposed between the upper mold 3*a* and the lower mold 3*b*, and the adsorption portions 6*a* adsorb the second surface of the wafer W. This step also corresponds to the adsorption step in the present disclosure. Additionally, the second surface of the wafer W in this case corresponds to the exposed surface in the present disclosure. Then, the wafer W is transported to the upper side of the tray 5 by the movement of the arm 4*a*. Further, the adsorption device 6 is reversed vertically and thereafter moves downward to release adsorption, and thus the wafer W is placed on the tray 5 with the second surface facing upward as illustrated in FIG. 10B.

As just described, in the known lens production device 101, the orientation of the wafer W placed on the tray 5 is reversed depending on whether the wafer W remains in the upper mold 3*a* or in the lower mold 3*b* after molding. As a result, there is an inconvenience, for example, in which the number of man-hours to orient the wafer W on the tray 5 in the same direction before providing the wafer W to the next step increases or the wafer W oriented in a reverse direction is provided to the next step due to a wrong operation.

Figure 1:
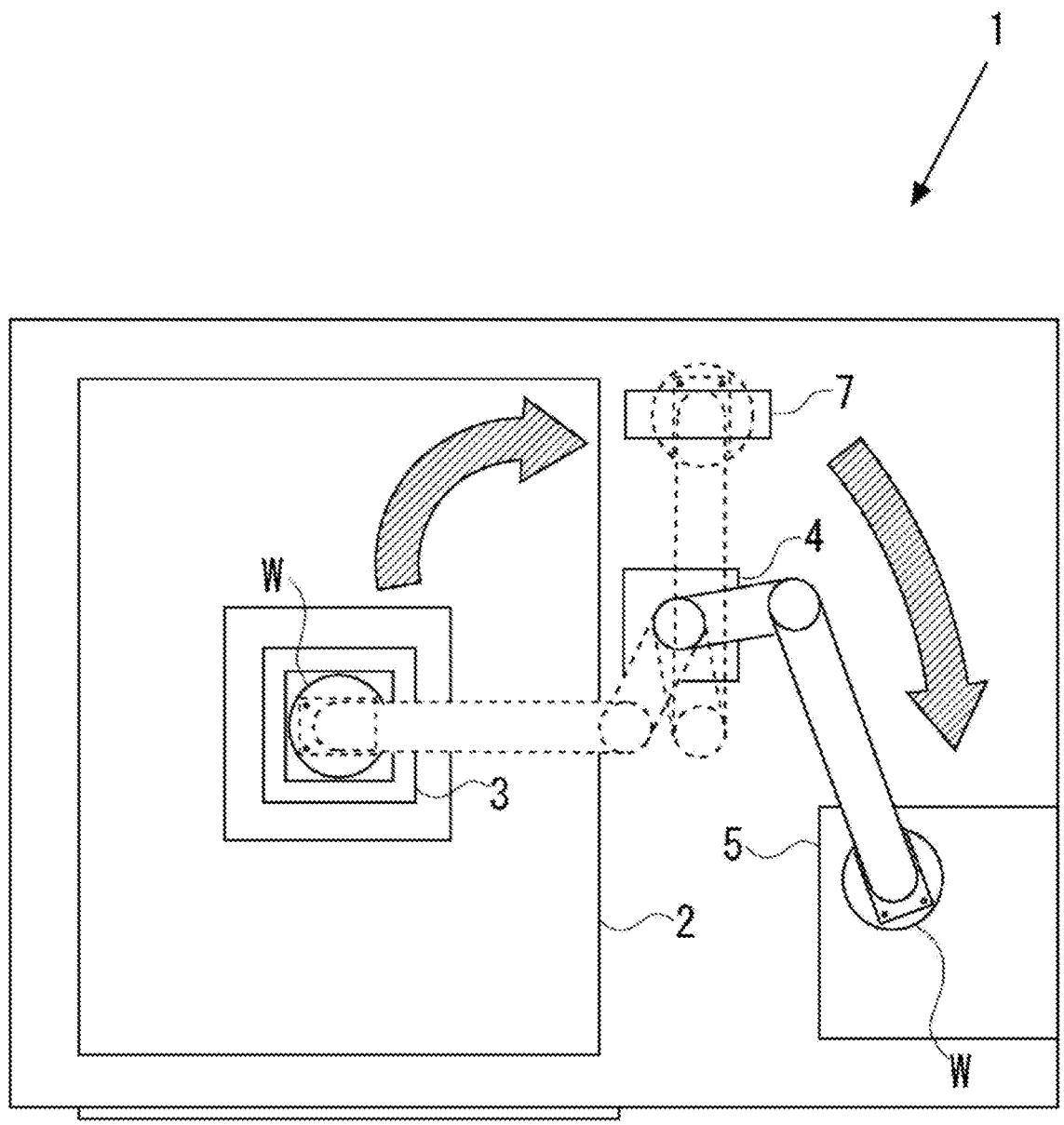
FIG. 1 is a schematic diagram of a lens production device related to a production method according to an embodiment of the present disclosure.

Next, the lens production device 1 in the present embodiment will be described with reference to FIG. 1. The lens production device 1 differs from the aforementioned lens production device 101 in that the lens production device 1 is provided with a reversing tray 7 that is configured to vertically reverse the wafer W, in the middle of transportation of the wafer W removed from the mold 3 to the tray 5 by the pickup robot 4. In the present embodiment, when the wafer W remains in the upper mold 3*a* after molding the wafer W, the pickup robot 4 reverses the wafer W vertically on the reversing tray 7.

When the wafer W remains in the lower mold 3*b* after molding the wafer W, the pickup robot 4 transports the wafer W to the tray 5 without reversing the wafer W vertically on the reversing tray 7. Note that the pickup robot 4 corresponds to a molded article moving device in the present embodiment. Further, a state where the wafer W remains in the upper mold 3*a* after molding the wafer W corresponds to a first state of the present disclosure. A state where the wafer W remains in the lower mold 3*b* after molding the wafer W corresponds to a second state of the present disclosure. Furthermore, the reversing tray 7 corresponds to a temporary placement tray of the present disclosure.

Figure 2A:
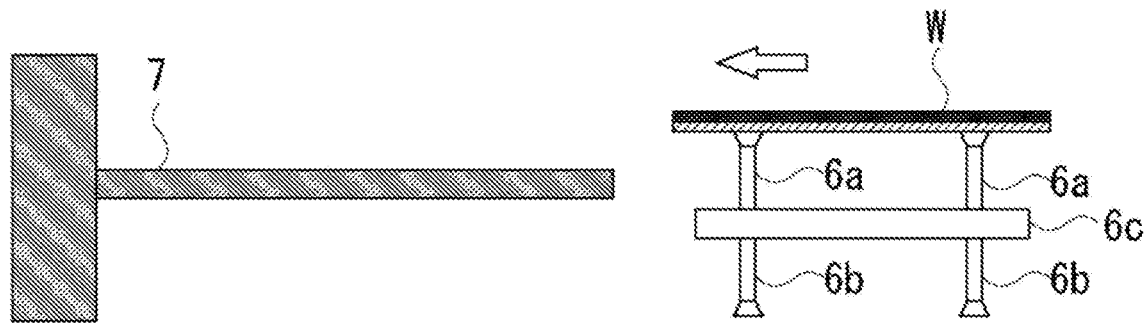
FIG. 2A-2C are first diagrams illustrating an operation of reversing a wafer with the use of a reversing tray.
Figure 2B:
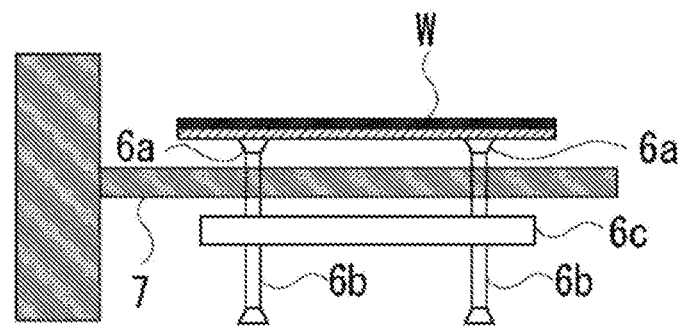

Next, an operation of reversing the wafer W by using the reversing tray 7 will be described with reference to FIGS. 2 to 4. The operation of reversing the wafer W corresponds to an adsorption surface changing step in the present disclosure. FIGS. 2 and 4 are views of the operation of reversing the wafer W viewed in the horizontal direction when the wafer W remains in the upper mold 3*a* after molding. FIG. 3A, 3B are views of the operation of reversing the wafer W in the same case viewed from above. First, as illustrated in FIG. 2A, the adsorption device 6 moves in the direction toward the reversing tray 7 with the wafer W adsorbed by the adsorption portions 6*a* on the upper side.

At that time, the height of the adsorption device 6 is controlled such that the height of the reversing tray 7 is located between the base 6*c* and the wafer W. Then, as illustrated in FIG. 2B, the adsorption device 6 is moved in the horizontal direction until the wafer W is located above the reversing tray 7 and the base 6*c* is located below the reversing tray 7. Note that, in this case, as illustrated in FIG. 3A, the reversing tray 7 passes through a space between the two adsorption portions 6*a* arranged in the depth direction corresponding to the depth direction of FIG. 2A-2C, and thus the adsorption portions 6*a* do not collide with the reversing tray 7.

Figure 2C:
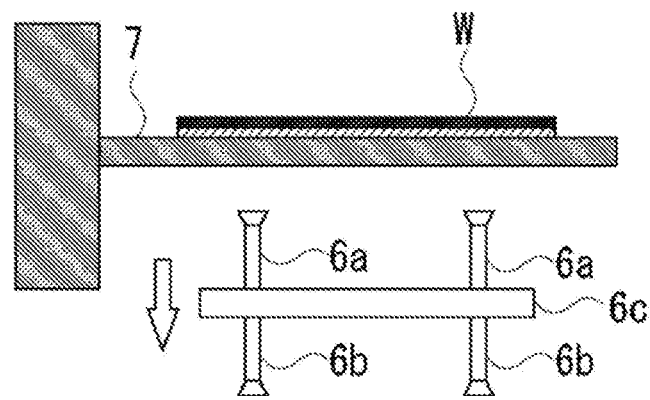
Figure 3A:
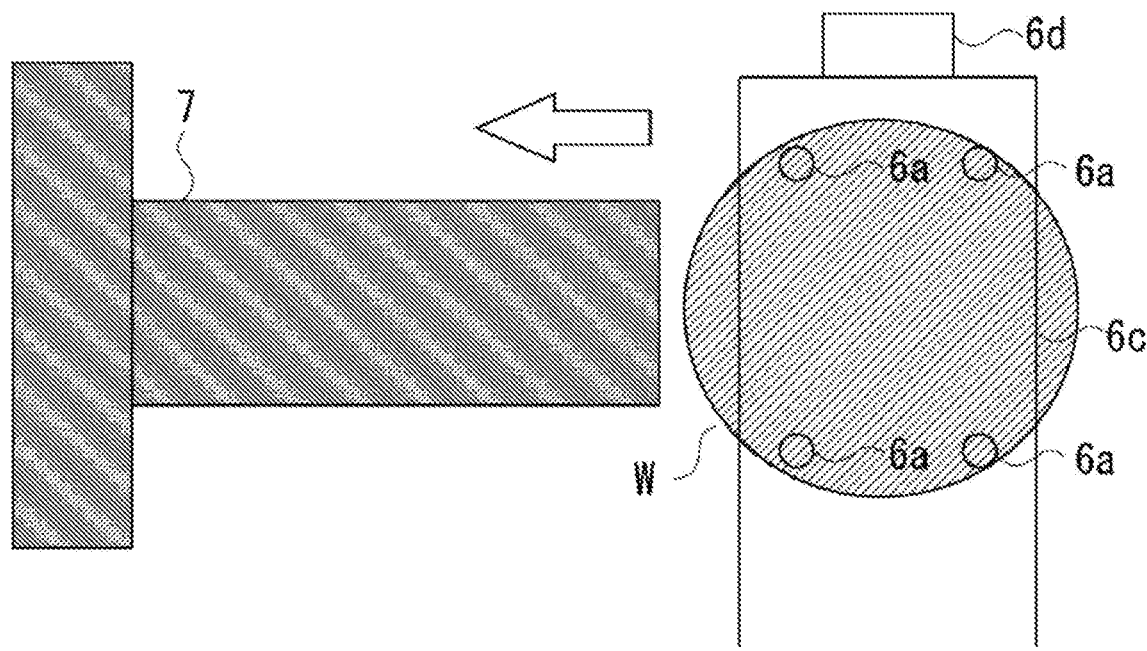
FIG. 3A, 3B are second diagrams illustrating an operation of reversing the wafer with the use of the reversing tray.
Figure 3B:
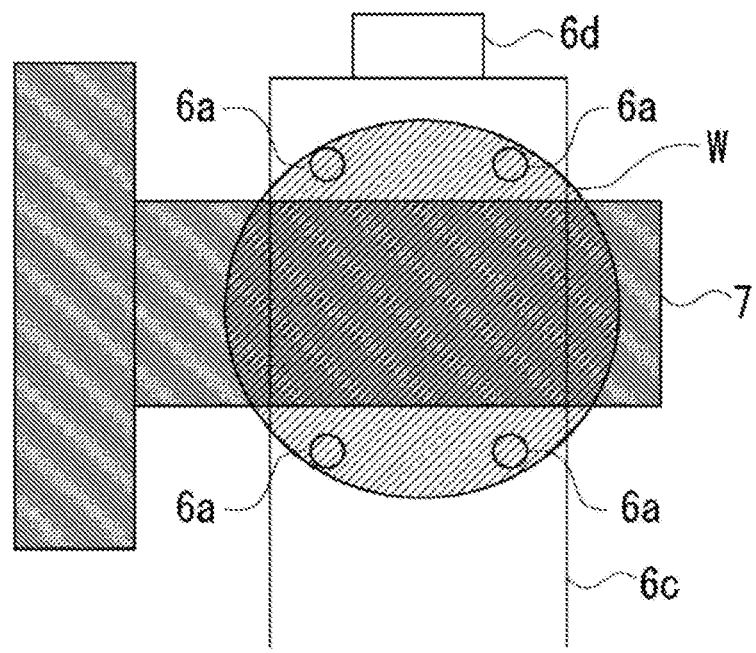
Figure 4A:
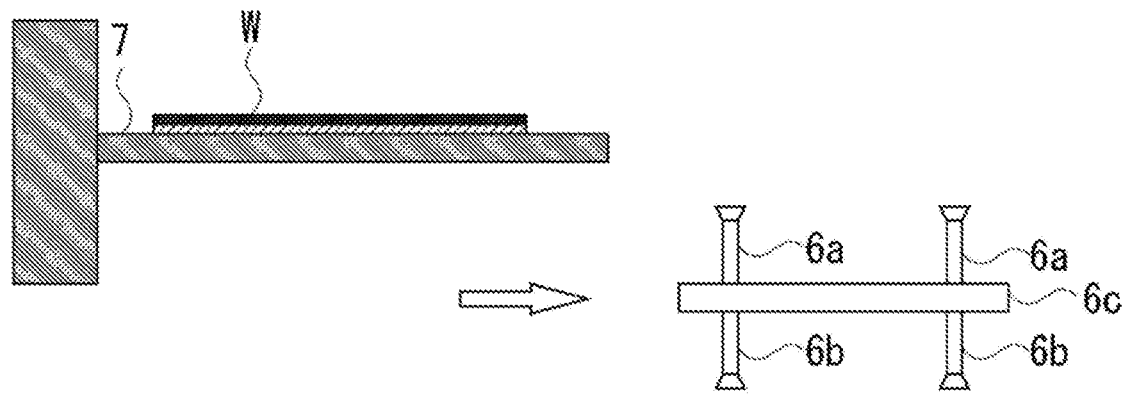
FIG. 4A-4C are third diagrams illustrating an operation of reversing the wafer with the use of the reversing tray.
Figure 4B:
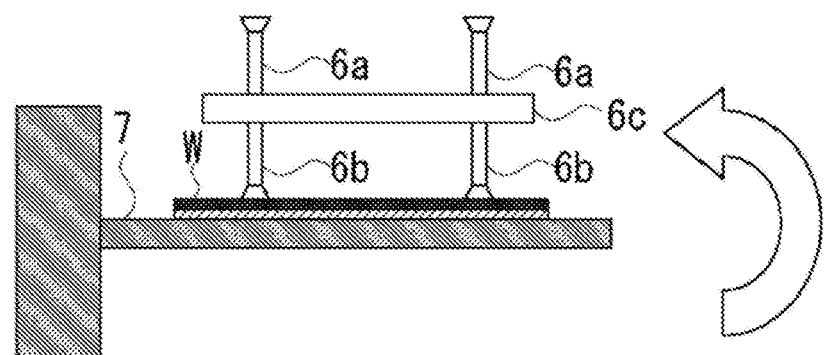
Figure 4C:
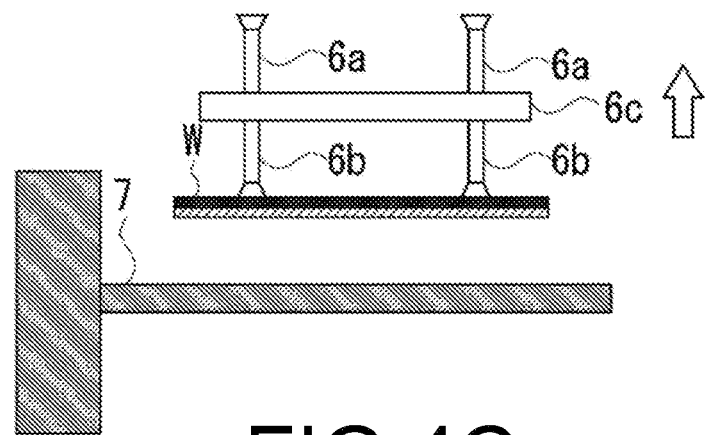

Next, adsorption by the adsorption portions 6*a* is released, and the adsorption device 6 is moved downward as illustrated in FIG. 2C. Therefore, the wafer W is left on the reversing tray 7 with the first surface facing upward. Then, as illustrated in FIG. 4A, the adsorption device 6 moves in the horizontal direction from the lower side of the reversing tray 7 to separate therefrom temporarily. Thereafter, as illustrated in FIG. 4B, the adsorption device 6 next moves to the upper side of the reversing tray 7. Further, the adsorption device 6 moves downward to adsorb the first surface of the wafer W, using the adsorption portions 6*b* on the lower side. Then, as illustrated in FIG. 4C, the adsorption device 6 moves upward while adsorbing the wafer W. Next, the pickup robot 4, as illustrated in FIG. 9B, moves the wafer W to the upper side of the tray 5 with the first surface facing upward and places the wafer W on the tray 5 as in the case where the wafer W remains in the lower mold 3b after molding the wafer W. This step corresponds to a placing step in the present disclosure.

As described above, according to the present embodiment, after molding the wafer W, whether the wafer W remains in the upper mold 3a or in the lower mold 3b is determined by the object detection sensor 6d, and when the wafer W remains in the lower mold 3b, the first surface of the wafer W is adsorbed by the adsorption portions 6b on the lower side. On the other hand, when the wafer W remains in the upper mold 3a, the second surface of the wafer W is adsorbed by the adsorption portions 6a on the upper side, and the first surface of the wafer W is readsorbed on the reversing tray 7 by the adsorption portions 6b on the lower side.

Therefore, whether the wafer W remains in the lower mold 3b or in the upper mold 3a after molding, the first surface can be consistently adsorbed by the adsorption portions 6b on the lower side at the time of moving the wafer W to the tray 5. As a result, the wafer W placed on the tray 5 can be automatically oriented in one direction, and variation in the orientation of the wafer W on the tray 5 can be avoided. Additionally, in the embodiment described above, it is not necessary to reverse the adsorption device 6 itself vertically; thus, the operation of the pickup robot 4 can be simplified, and cost reduction and takt time reduction can be achieved. Here, a step of determining whether the wafer W remains in the upper mold 3a or in the lower mold 3b by the object detection sensor 6d corresponds to a state determination step in the present disclosure.

Note that a case where the adsorption device 6 including, above and below the base 6c, the adsorption portions 6a on the upper side and the adsorption portions 6b on the lower side is described in the present disclosure; however, the production method of the present disclosure is applicable to a case where the adsorption device 6 includes adsorption portions only on one side of the base 6c. In this case, depending on whether the wafer W remains in the upper mold 3a or in the lower mold 3b after the completion of molding, the adsorption device 6 is reversed vertically by the operation of the arm 4a of the pickup robot 4, and the exposed surface of the wafer W is adsorbed by the adsorption portions.

Even in this case, as in the embodiment describe above, the surface of the wafer W to be adsorbed by the adsorption portions differs depending on whether the wafer W remains in the upper mold 3a or in the lower mold 3b after the completion of molding. Therefore, for example, when the wafer W remains in the upper mold 3a after the completion of molding, the surface of the wafer W to be adsorbed by the adsorption portions is reversed on the reversing tray 7, and thus the wafer W on the tray 5 can be oriented in the same direction.

Note that the pickup robot 4 is described as an example of the molded article moving device in the embodiment described above; however, the molded article moving device is not necessarily a robot. The molded article moving device may be any production machine that operates according to a predetermined sequence. Additionally, in the embodiment described above, the surface on which the lens of the wafer W is formed is the first surface and the opposite surface is the second surface; however, the definition of the first surface and the second surface is not limited to the above. Further, the wafer-level lens is described above as an example of the lens molded article; however, the lens molded article is not limited to the wafer-level lens. The lens molded article can be any molded article that has a lens function, and may be a molded article that includes, for example, only one lens. Furthermore, the material of the lens molded article may be a resin material, or may be another material such as glass. The molding method can also be any molding method such as injection molding, imprinting molding, casting molding, or the like.

Additionally, in the embodiment described above, the locations on the wafer W to be adsorbed by the adsorption portions 6a, 6b are not limited to the locations described above. For example, in FIG. 3B, any location of an area of the wafer W that does not overlap the reversing tray 7 in plan view may be adsorbed. Additionally, in the embodiment described above, the adsorption portions 6a, 6b are tubular portions, and the tips thereof have a sucker-like shape; however, the shape of the adsorption portions is not limited thereto. A surface of a portion of the area that can be adsorbed may be adsorbed. In this case, the tip of the adsorption portion may be formed of, for example, a porous material.

Figure 5A:
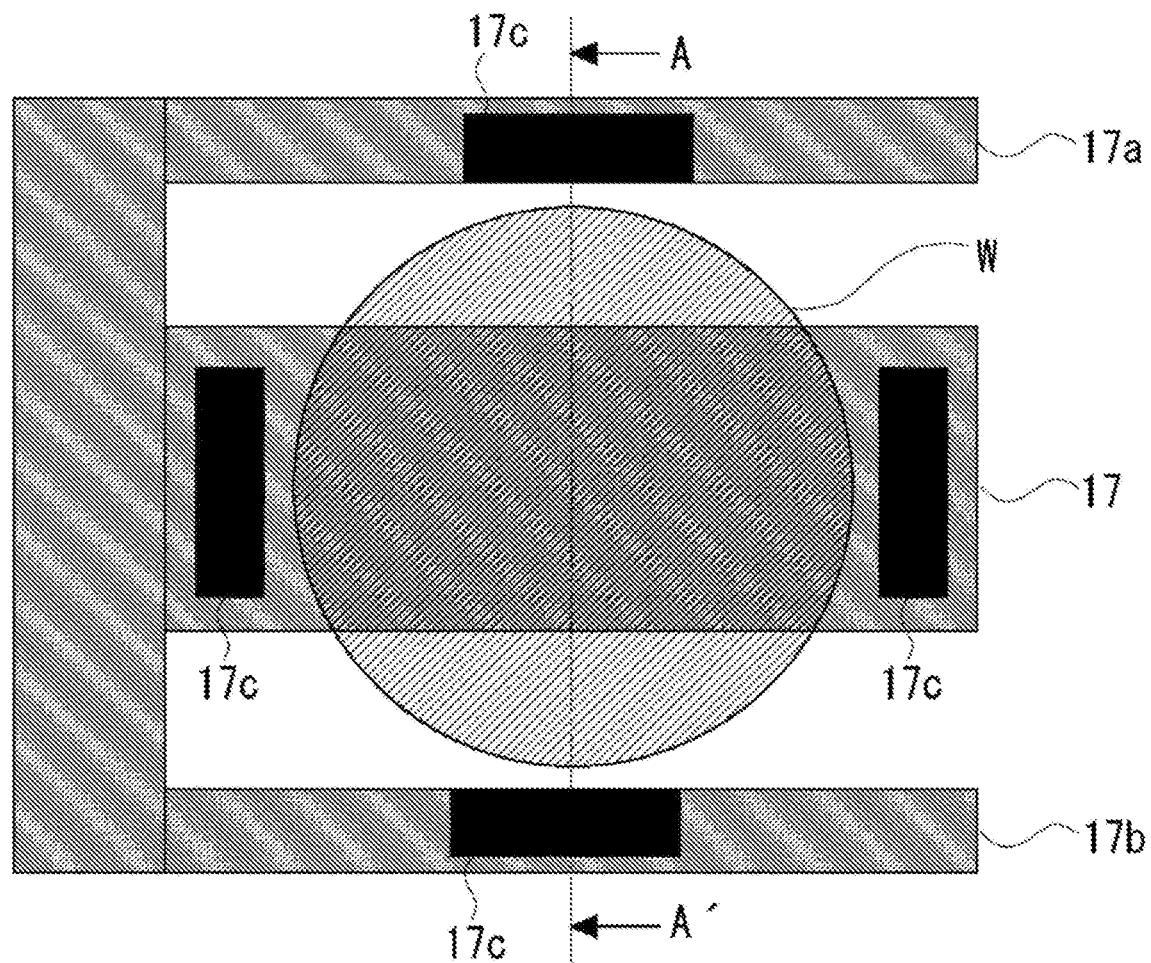
FIG. 5A, 5B are diagrams illustrating an example in which the reversing tray has a different shape.
Figure 5B:
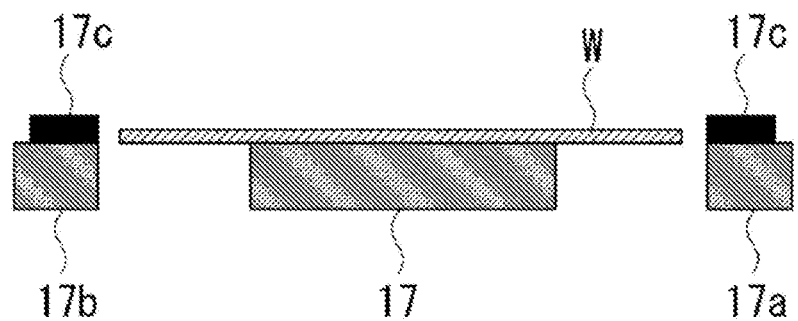

Additionally, in the embodiment described above, the reversing tray 7 has a flat plate shape; however, the shape of the reversing tray 7 is not limited thereto. FIG. 5A, 5B illustrate the schematic configuration of a reversing tray 17 that has a different shape from the reversing tray 7. FIG. 5A is a plan view and FIG. 5B is a cross-sectional view taken along the cross-section A-A'. Auxiliary trays 17a, 17b are provided on both sides of the reversing tray 17 in the direction perpendicular to the direction of travel of the wafer W. Note that during the operation of reversing the wafer W, the adsorption portions 6a pass through gaps between the reversing tray 17 and the auxiliary tray 17a and between the reversing tray 17 and the auxiliary tray 17b, and thus the adsorption portions 6a do not collide with the reversing tray 17 or the auxiliary trays 17a, 17b.

Projections 17c that restrict the movement of the wafer W in the horizontal direction are provided on the reversing tray 17 and the auxiliary trays 17a, 17b at four locations in the direction of travel of the wafer W in plan view and in the direction perpendicular to the direction of travel. Thus, the wafer W can be more reliably held on the reversing tray 17.

Figure 6A:
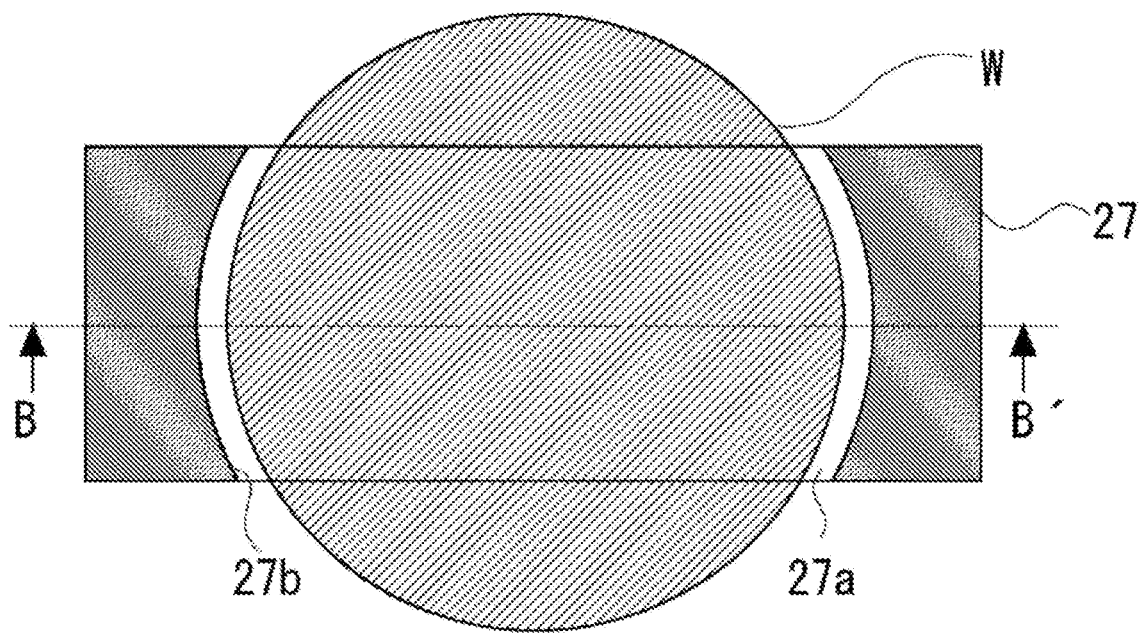
FIG. 6A, 6B are diagrams illustrating an example in which the reversing tray has another different shape.
Figure 6B:
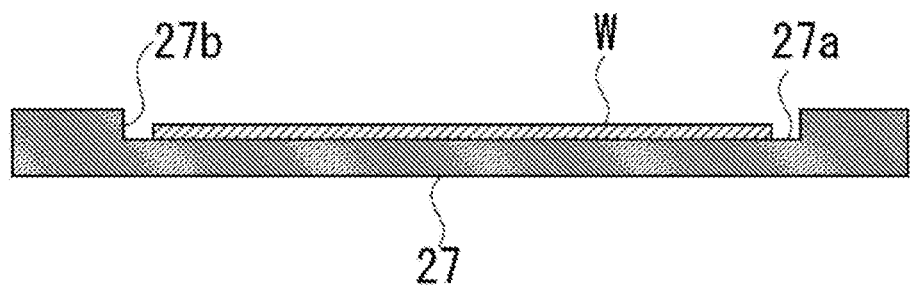

Next, FIG. 6A, 6B illustrate the schematic configuration of a reversing tray 27 having another different shape. FIG. 6A is a plan view and FIG. 6B is a cross-sectional view taken along the cross-section B-B'. A recessed portion 27a including an arc-shaped step 27b having a diameter slightly larger than an outer diameter of the wafer W in plan view is formed in a portion of the reversing tray 27 where the wafer W is placed. The step 27b restricts the movement of the wafer W in the horizontal direction. With this structure, the wafer W can be more reliably held on the reversing tray 27.

The embodiments of the method of producing a lens molded article according to the present disclosure are described above; however, aspects disclosed in the present specification can be combined with any other features disclosed in the present specification.

CROSS-REFERENCE TO RELATED APPLICATION

This application is based upon and claims the benefit of priority of the prior Japanese Patent Application No. 2022-018126, filed on Feb. 8, 2022, the entire contents of which are incorporated herein by reference.

REFERENCE SIGNS LIST

1 Lens production device
2 Molding machine

3 Mold
3a Upper mold
3b Lower mold
4 Pickup robot
4a Arm
5 Tray
6 Adsorption device
6a, 6b Adsorption portion
6c Base
6d Object detection sensor
7, 17, 27 Reversing tray

The invention claimed is:

1. A method of producing a lens molded article with a mold including an upper mold and a lower mold, the method comprising:
 a state determination of determining, after molding the lens molded article, whether a state is a first state where the lens molded article molded remains in the upper mold with the upper mold and the lower mold separated from each other or a second state where the lens molded article molded remains in the lower mold with the upper mold and the lower mold separated from each other;
 an adsorption of adsorbing, in accordance with a determination result in the state determination, an exposed surface of the lens molded article remaining in the upper mold or the lower mold, by an adsorption device disposed at a tip of an arm of a molded article moving device;
 an adsorption surface change of changing an adsorption surface from a surface adsorbed by the adsorption device to an opposite surface to the exposed surface when the determination result in the state determination is either one of the first state or the second state; and
 a placement of placing the lens molded article on a tray by releasing adsorption by the adsorption device of the lens molded article adsorbed by the adsorption device.

2. The method of producing a lens molded article, according to claim 1, wherein
 in the adsorption surface change, adsorption by the adsorption device of the lens molded article adsorbed by the adsorption device is released and thereby the lens molded article is temporarily placed on a temporary placement tray, and
 the adsorption device readsorbs the opposite surface to the exposed surface.

3. The method of producing a lens molded article, according to claim 2, wherein the adsorption surface change is performed only when the state is determined to be the first state in the state determination.

4. The method of producing a lens molded article, according to claim 3, wherein
 both of an upper side and a lower side of the adsorption device are provided with the adsorption portions configured to adsorb a surface of the lens molded article, and
 in the adsorption,
 when the determination result in the state determination is the first state, the exposed surface of the lens molded article is adsorbed by the adsorption portion provided on the upper side of the adsorption device, and when the determination result is the second state, the exposed surface of the lens molded article is adsorbed by the adsorption portion provided on the lower side of the adsorption device.

5. The method of producing a lens molded article, according to claim 4, wherein
 in the adsorption surface change,
 the lens molded article is temporarily placed on the temporary placement tray from the lower side in a state where the exposed surface of the lens molded article is adsorbed by the adsorption portion provided on the upper side of the adsorption device, and
 the adsorption device readsorbs the opposite surface to the exposed surface from the upper side by the adsorption portion provided on the lower side of the adsorption device.

* * * * *